(12) United States Patent
Zhu et al.

(10) Patent No.: US 12,335,161 B2
(45) Date of Patent: Jun. 17, 2025

(54) MESSAGE FORWARDING METHOD, MESSAGE FORWARDING DEVICE AND COMPUTER-READABLE MEDIUM

(71) Applicant: ZTE CORPORATION, Guangdong (CN)

(72) Inventors: Xiangyang Zhu, Guangdong (CN); Yufang Han, Guangdong (CN); Jinghai Yu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 137 days.

(21) Appl. No.: 18/031,587

(22) PCT Filed: Oct. 11, 2021

(86) PCT No.: PCT/CN2021/123104
§ 371 (c)(1),
(2) Date: Apr. 12, 2023

(87) PCT Pub. No.: WO2022/078296
PCT Pub. Date: Apr. 21, 2022

(65) Prior Publication Data
US 2023/0388242 A1 Nov. 30, 2023

(30) Foreign Application Priority Data
Oct. 15, 2020 (CN) .......................... 202011101517.1

(51) Int. Cl.
*G06F 15/173* (2006.01)
*H04L 47/28* (2022.01)
*H04L 47/52* (2022.01)

(52) U.S. Cl.
CPC ............ *H04L 47/522* (2013.01); *H04L 47/28* (2013.01)

(58) Field of Classification Search
CPC .............................. H04L 47/522; H04L 47/28
(Continued)

(56) References Cited

U.S. PATENT DOCUMENTS

2008/0075123 A1* 3/2008 Fourcand .............. H04J 3/1682
370/503
2009/0226170 A1* 9/2009 Zou ....................... H04J 3/1694
398/79

(Continued)

FOREIGN PATENT DOCUMENTS

CN 101212396 A 7/2008
JP 2008219555 A 9/2008
(Continued)

OTHER PUBLICATIONS

Japan Patent Office, JP2022-576148 First Office Action issued on Jan. 30, 2024.
(Continued)

*Primary Examiner* — Alan S Chou
(74) *Attorney, Agent, or Firm* — Li & Cai Intellectual Property (USA) Office (57) ABSTRACT

The present disclosure provides a message forwarding method, including: receiving a target message from an upstream device, the target message carrying first timeslot information including a first timeslot length and a first timeslot identifier; determining a second timeslot length and a second timeslot identifier according to the first timeslot length and the first timeslot identifier; and in response to that a preset waiting time elapses after the target message enters a cache queue corresponding to the second timeslot length and the second timeslot identifier, forwarding the target message. The present disclosure further provides a message forwarding device, and a computer-readable medium.

10 Claims, 4 Drawing Sheets

(58) Field of Classification Search
USPC .......................................................... 709/238
See application file for complete search history.

(56) References Cited

U.S. PATENT DOCUMENTS

| | | |
|---|---|---|
| 2009/0245289 A1 | 10/2009 | Sprague |
| 2013/0315596 A1* | 11/2013 | Rollet .................... H04B 10/27 |
| | | 398/67 |
| 2016/0308610 A1 | 10/2016 | An |
| 2016/0366064 A1* | 12/2016 | Chen ....................... H04L 47/28 |
| 2019/0155645 A1 | 5/2019 | Browne |
| 2019/0181999 A1 | 6/2019 | Du |
| 2021/0044374 A1* | 2/2021 | Lin .................... H04Q 11/0067 |

FOREIGN PATENT DOCUMENTS

| | | | |
|---|---|---|---|
| JP | 2008277873 A | 11/2008 | |
| JP | 2017512406 A | 5/2017 | |

OTHER PUBLICATIONS

European Patent Office, the Extended European Search Report dated Sep. 17, 2024, for corresponding EP application No. 21879340.4.

* cited by examiner

According to the upstream timeslot lengths in all timeslot templates, a number of upstream timeslots corresponding to the upstream timeslot lengths, all the downstream timeslot lengths preset by the current device, and a number of downstream timeslots corresponding to the downstream timeslot lengths, establish a mapping relationship between upstream timeslot identifiers under all upstream timeslot lengths and downstream timeslot identifiers under all downstream timeslot lengths — S021

In response to that a quotient N of a first downstream timeslot length and a first upstream timeslot length is an integer, and a product of the first upstream timeslot length and a number of upstream timeslots corresponding to the first upstream timeslot length is equal to a product of the first downstream timeslot length and a number of downstream timeslots corresponding to the first downstream timeslot length, establish a mapping relationship between N upstream timeslot identifiers under the first upstream timeslot length and one downstream timeslot identifier under the first downstream timeslot length — S021a In response to that a quotient M of a second upstream timeslot length and a second downstream timeslot length is an integer, and a product of the second upstream timeslot length and a number of upstream timeslots corresponding to the second upstream timeslot length is equal to a product of the second downstream timeslot length and a number of downstream timeslots corresponding to the second downstream timeslot length, establish a mapping relationship between one upstream timeslot identifier under the second upstream timeslot length and M downstream timeslot identifiers under the second downstream timeslot length — S021b

MESSAGE FORWARDING METHOD, MESSAGE FORWARDING DEVICE AND COMPUTER-READABLE MEDIUM

CROSS-REFERENCE TO RELATED APPLICATIONS

The present application claims the priority of Chinese Patent Application No. 202011101517.1, filed on Oct. 15, 2020, the contents of which are incorporated herein in their entirety by reference.

TECHNICAL FIELD

The present disclosure relates to the field of communication technology, and in particular, to a message forwarding method, a message forwarding device, and a computer-readable medium.

BACKGROUND

In the existing art, two solutions exist for a time synchronization of devices in a network: in a synchronization mode, all devices in the network are desired to be synchronized strictly in time, a receiving port of each device determines a receiving time of each message, determines a specific receiving time period in which the message falls, and sends the message out in a following specified time period; in an asynchronous mode, different devices in the network are desired to be kept at synchronous frequencies and have time slices with a same size, phases of the respective devices are different, and in a message forwarding process, each message sent carries a timeslot label, and each device determines a timeslot for forwarding the message according to the timeslot label.

In the asynchronous mode, since the time slices of the network devices in the network are desired to have a same size, that is, timeslot lengths supported by the network devices are desired to be the same, in a case where timeslots supported by part of the network devices are actually inconsistent with those supported by the other network devices, resulting in that the forwarding device does not support the corresponding timeslot length for an upstream device sending the message, therefore the forwarding device cannot forward the message.

SUMMARY

In a first aspect, the present disclosure provides a message forwarding method, including: receiving a target message from an upstream device, the target message carrying first timeslot information including a first timeslot length and a first timeslot identifier; determining a second timeslot length and a second timeslot identifier according to the first timeslot length and the first timeslot identifier; and in response to that a preset waiting time elapses after the target message enters a cache queue corresponding to the second timeslot length and the second timeslot identifier, forwarding the target message.

In a second aspect, the present disclosure further provides a message forwarding device, including: at least one processor; and a storage device configured to store at least one program; the at least one program, executed by the at least one processor, causes the at least one processor to implement the method described above.

In a third aspect, the present disclosure further provides a computer-readable medium storing a computer program thereon, the computer program, executed by a processor, causes the processor to perform the method described above.

BRIEF DESCRIPTION OF DRAWINGS

FIG. 5 is a flowchart illustrating an implementation of operation S02 according to the present disclosure;
FIG. 6 is a flowchart illustrating an implementation of operation S021 according to the present disclosure.

DETAIL DESCRIPTION OF EMBODIMENTS

In order to make those skilled in the art better understand technical solutions of the present disclosure, a message forwarding method, a message forwarding device, and a computer-readable medium according to the present disclosure are further described in detail below with reference to the accompanying drawings.

Exemplary embodiments are described in detail below with reference to the accompanying drawings, but may be embodied in different forms, and should not be construed as a limitation. The embodiments are illustrated merely for making the present disclosure more thorough and complete, and for those skilled in the art fully understanding the scope of the present disclosure.

The terms used in the present disclosure are for a purpose of describing particular implementations only, but are not intended to limit the present disclosure. As used in the present disclosure, singular forms "a" and "the" are intended to include plural forms as well, i.e., to represent at least one, unless the context clearly defines otherwise. It should further be understood that terms "includes/comprises" and/or "made of/consisted of" in the present disclosure are used to specify a presence of at least one of recited features, integers, steps, operations, elements and/or components, but do not preclude a presence or an addition of at least one of other features, integers, steps, operations, elements, components and/or groups thereof.

It should be understood that the terms "first", "second" and the like in the present disclosure are used for describing various elements, but the various elements are not limited by the terms. The terms are only used to distinguish one element from another. Thus, a first element, a first component, or a first module discussed below may be termed a second element, a second component, or a second module without departing from the teachings of the present disclosure.

Unless otherwise defined, meanings of all terms (including technical terms and scientific terms) used herein are the same as those commonly understood by one of ordinary skill in the art. It should further be understood that terms, such as those defined in common dictionaries, should be construed as having a meaning that is consistent with that in background of the existing art and the present disclosure, and should not be construed as having an idealized or over-formal meaning, unless expressly defined in the present disclosure.

According to the message forwarding method, the message forwarding device, and the computer-readable medium provided in the present disclosure, a second timeslot length and a second timeslot identifier are correspondingly determined according to a first timeslot length and a first timeslot identifier carried in a target message, and the target message is placed in a cache corresponding to the second timeslot length and the second timeslot identifier and is forwarded, so that a device in a network can select a forwarding timeslot according to first timeslot information indicated in the message, and a situation where the message cannot be forwarded due to a fact that a timeslot length selected for an upstream device sending the message is not supported is avoided. The method and device provided in the present disclosure are applicable to time-sensitive networks (TSN), deterministic networks (DetNet), networks adopting IEEE 802.1Qbv standard and IEEE 802.1Qch standard, and other networks adopting a circular queue forwarding (CQF) mechanism, and the like.

Figure 1:
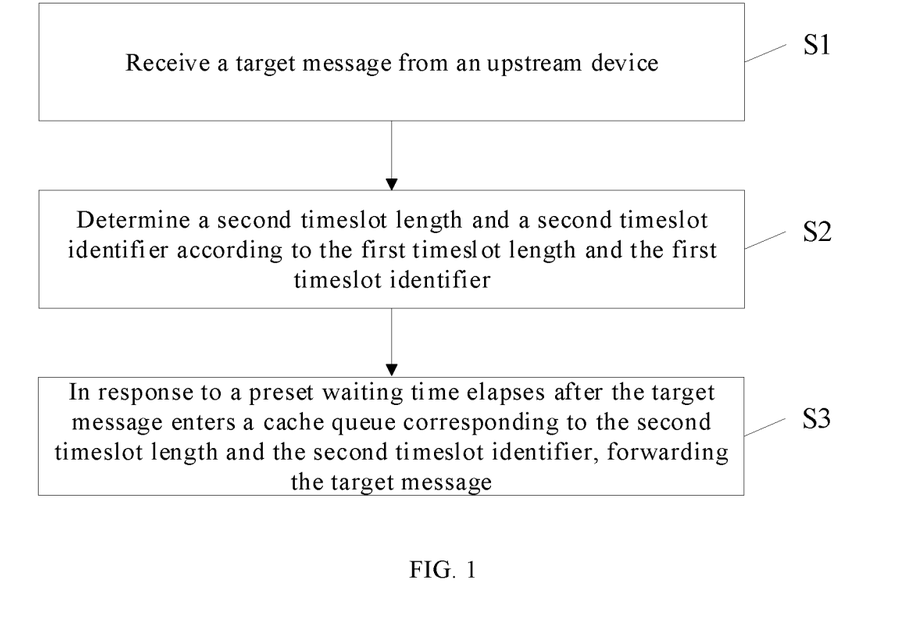
FIG. 1 is a flowchart of a message forwarding method according to the present disclosure.

FIG. 1 is a flowchart of a message forwarding method according to the present disclosure. As shown in FIG. 1, the message forwarding method includes following operations S1 to S3.

At operation S1, receiving a target message from an upstream device.

The target message carries first timeslot information including a first timeslot length and a first timeslot identifier. Specifically, the term "upstream" is a relative concept, indicates that a certain device in a current communication link is ahead of/prior to a current device, and the device may be a forwarding device or a user-side device, and accordingly, the current device is a downstream device in the current communication link relative to the "upstream device" in operation S1; the first timeslot information is configured to indicate a corresponding sending timeslot in which the upstream device sends the target message, the first timeslot identifier is configured to identify the sending timeslot, and includes a plurality of forms such as a timeslot number, a timeslot label or the like.

In some implementations, the first timeslot information further includes a unit of the first timeslot length, specifically, the unit of the first timeslot length is a time unit, which may be set to be nanosecond, microsecond, millisecond, second, or the like.

At operation S2, determining a second timeslot length and a second timeslot identifier correspondingly according to the first timeslot length and the first timeslot identifier.

In some implementations, the current device supports and maintains at least one timeslot length, specifically, a network-wide time of a network to which the current device belongs is divided into a plurality of continuous timeslots with a same length, a division basis of the process of dividing is the timeslot length, each timeslot has a respective timeslot identifier, and if a plurality of timeslot lengths exist, a plurality of division modes correspondingly exist. For example, the current device maintains a plurality of timeslot lengths and timeslot identifiers corresponding to the timeslot lengths, after receiving the target message from the upstream device, the determining a second timeslot length and a second timeslot identifier correspondingly according to the first timeslot length and the first timeslot identifier in the target message may include following implementations: taking a timeslot length, maintained by the current device, equal to the first timeslot length as the second timeslot length, and taking a $k^{th}$ timeslot identifier after the first timeslot identifier as the second timeslot identifier, i.e., determining a $k^{th}$ timeslot after a timeslot corresponding to the first timeslot identifier as a forwarding timeslot, k is an integer; or, taking a timeslot length, maintained by the current device, having an integral multiple relation with the first timeslot length and being greater than the first timeslot length as the second timeslot length, and taking a next timeslot identifier having the same parity relation as the first timeslot identifier as the second timeslot identifier.

It should be noted that the above description of the determining a second timeslot length and a second timeslot identifier correspondingly according to the first timeslot length and the first timeslot identifier is only for one implementation in the present disclosure, and does not limit the technical solution of the present disclosure, other implementations for the determining a second timeslot length and a second timeslot identifier correspondingly according to the first timeslot length and the first timeslot identifier are also applicable to the technical solution of the present disclosure In some implementations, the determining a second timeslot length and a second timeslot identifier correspondingly according to the first timeslot length and the first timeslot identifier includes: based on a timeslot mapping relationship issued by a network control plane, determining the second timeslot length and the second timeslot identifier correspondingly according to the first timeslot length and the first timeslot identifier.

At operation S3, in response to that a preset waiting time elapses after the target message enters a cache queue corresponding to the second timeslot length and the second timeslot identifier, forwarding the target message.

In some implementations, the waiting time is calculated and issued by the network control plane, or set by the current device according to a network condition, a message size, system resources, and the like, and generally, the waiting time may be set according to a timeslot length, for example, the waiting time is set to a time duration corresponding to the second timeslot length.

In some implementations, in operation S3, the forwarding the target message includes: replacing the first timeslot length with the second timeslot length, replacing the first timeslot identifier with a timeslot identifier corresponding to a current timeslot after the waiting time elapses, and forwarding the target message, so that a downstream device of the current device in a current link to perform corresponding identification and processing according to replaced first timeslot information, the downstream device may be a forwarding device or a user-side device.

In the message forwarding method provided in the present disclosure, the second timeslot length and the second timeslot identifier are correspondingly determined according to the first timeslot length and the first timeslot identifier carried in the target message, and the target message is placed into a cache corresponding to the second timeslot length and the second timeslot identifier and is forwarded, so that a device in the network can select a forwarding timeslot according to the first timeslot information indicated in the message, and a situation where the message cannot be forwarded due to a fact that a timeslot length selected for the upstream device sending the message is not supported is avoided.

Figure 2:
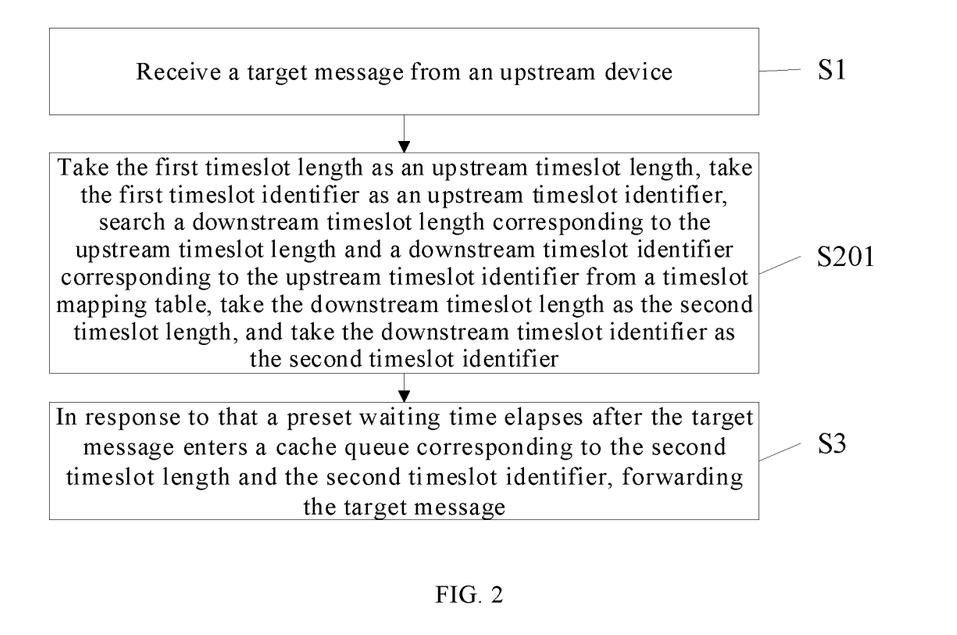
FIG. 2 is a flowchart of a message forwarding method according to the present disclosure.

FIG. 2 is a flowchart of a message forwarding method according to the present disclosure. As shown in FIG. 2, the message forwarding method is a specific implementation based on the method shown in FIG. 1. Specifically, the message forwarding method includes operations S1 to S3, the operation S2 of the determining a second timeslot length and a second timeslot identifier correspondingly according to the first timeslot length and the first timeslot identifier further includes following operation S201. Only operation S201 is described in detail below.

At operation S201, taking the first timeslot length as an upstream timeslot length, taking the first timeslot identifier as an upstream timeslot identifier, searching a downstream timeslot length corresponding to the upstream timeslot length and a downstream timeslot identifier corresponding to the upstream timeslot identifier from a timeslot mapping table, taking the downstream timeslot length as the second timeslot length, and taking the downstream timeslot identifier as the second timeslot identifier.

The timeslot mapping table records a mapping relationship between the upstream timeslot identifier under the upstream timeslot length and the downstream timeslot identifier under the downstream timeslot length of a current device. Specifically, the upstream device and the current device respectively support and maintain at least one timeslot length and timeslot identifiers corresponding to timeslots divided according to the at least one timeslot length, the timeslot mapping table is configured to indicate a mapping relationship between timeslot identifiers of the upstream device and timeslot identifiers of the current device, timeslot lengths and timeslot identifiers corresponding to each other are stored in a form of a two-tuple, and the mapping relationship is established between two-tuples; or the timeslot length serves as an upper layer attribute, corresponding timeslot identifiers are stored under the timeslot length, and the mapping relationship is established between the timeslot identifiers under the timeslot length.

Figure 3:
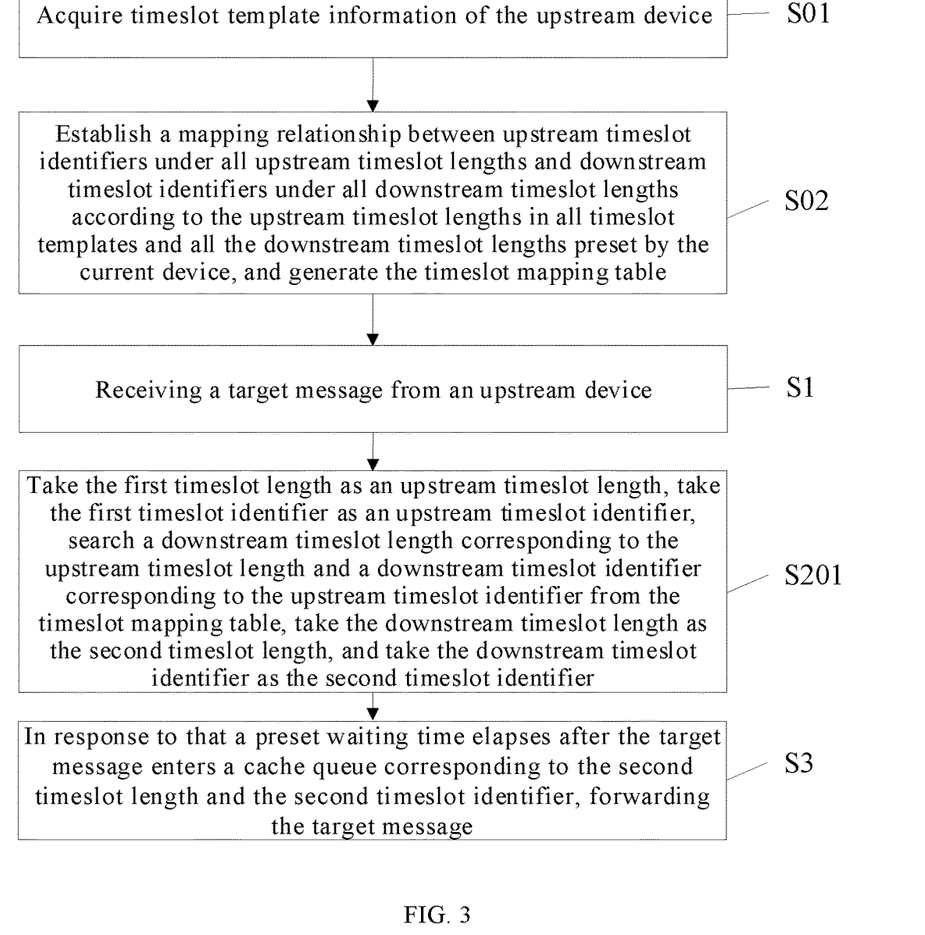
FIG. 3 is a flowchart of a message forwarding method according to the present disclosure.

FIG. 3 is a flowchart of a message forwarding method according to the present disclosure. As shown in FIG. 3, the message forwarding method is an implementation based on the method shown in FIG. 2. Specifically, the message forwarding method not only includes operations S1 to S3, but further includes following operations S01 and S02 before operation S1 of the receiving a target message from an upstream device. Only operations S01 and S02 are described in detail below.

At operation S01, acquiring timeslot template information of the upstream device.

The timeslot template information includes at least one timeslot template including a corresponding upstream timeslot length and all upstream timeslot identifiers under the upstream timeslot length. Specifically, each forwarding device in the network maintains its own one or more timeslot templates, and neighbor devices and nodes of each device are desired to know information related to the timeslot templates of the current device.

In some implementations, operation S01 of the acquiring timeslot template information of the upstream device includes: receiving the timeslot template information sent by the upstream device through a link layer discovery protocol (LLDP); and, the message forwarding method further includes: sending information indicating a timeslot template of the current device to a downstream device through the LLDP. Specifically, the timeslot template information may be advertised through a LLDP message carrying a TLV (Type Length Value) three-tuple.

Figure 4:
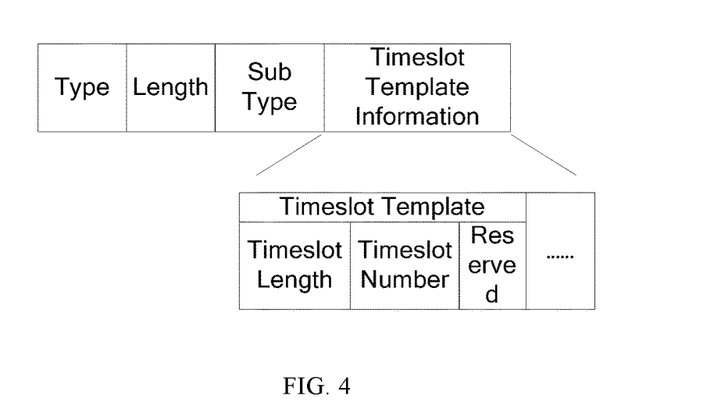
FIG. 4 is a schematic diagram of a format of a TLV three-tuple according to the present disclosure.

FIG. 4 is a schematic diagram of a format of a TLV three-tuple according to the present disclosure. As shown in FIG. 4, the TLV includes: a field of type (TLV type), a field of length (TLV information string length), a field of sub-type (802.1 sub-type) and timeslot template information, the field of type and the field of length constitute a header area of a message. The field of type is configured to indicate a type of the TLV, and occupies seven bits, for example, a type of LLDP Organizationally Specific TLV is used, and a value of the type is 127, or a reserved value of the field of type may be used to define a new optional TLV type; the field of length is configured to indicate a length of the TLV, and occupies 4+2*a bits, a is a number of timeslot templates in the timeslot template information; the field of sub-type is configured to indicate a sub-type of the TLV, and occupies one byte, and the sub-type is supplementary to the type, in this example, the sub-type of the TLV indicates that the TLV (timeslot information TLV) carrying the timeslot template information; the timeslot template information includes at least one timeslot template, each single timeslot template occupies two bytes including a field of timeslot length occupying one byte, a field of timeslot number occupying four bits, and a reserved field occupying four bits, and specifically, the field of timeslot length (timeslot size) may be an absolute value of the timeslot length, or may be a quotient of the timeslot length and a corresponding default timeslot length, or may be equal to b, the timeslot length is a product of a corresponding default period length and $2^b$, and b is an integer; in addition, the timeslot identifier is in a form of a timeslot number, and is taken by default from an arithmetic progression, with a first term of 0, composed of free natural numbers, and is indicated by the field of timeslot number, for example, in a case where the timeslot number is 2, the timeslot identifier is determined to be 0 and 1.

In some implementations, operation S01 of the acquiring timeslot template information of the upstream device includes: receiving the timeslot template information of the upstream device issued by the network control plane; and, the message forwarding method further includes: sending information indicating the timeslot template of the current device to the network control plane through a Netconf protocol, so that the network control plane calculates a corresponding mapping relationship according to the information and sends the corresponding mapping relationship to the downstream device of the current device.

It should be noted that, the above description of the timeslot template information and other related information carried in each protocol message is only for one implementation in the present disclosure, and does not limit the technical solution of the present disclosure, and other protocol messages are also applicable to the technical solution of the present disclosure.

At operation S02, establishing a mapping relationship between upstream timeslot identifiers under all upstream timeslot lengths and downstream timeslot identifiers under all downstream timeslot lengths according to the upstream timeslot lengths in all the timeslot templates and all the downstream timeslot lengths preset by the current device, and generating the timeslot mapping table.

The mapping relationship between the corresponding timeslot identifiers may be established according to a relationship between the upstream timeslot length and the downstream timeslot length, or according to whether the upstream timeslot length or the downstream timeslot length meets a preset numerical condition, or the corresponding mapping relationship may be matched in preset mapping relationships issued from the network control plane according to the upstream timeslot length and the downstream timeslot length.

FIG. 5 is a flowchart illustrating an implementation of operation S02 according to the present disclosure. As shown in FIG. 5, in operation S02, the establishing a mapping relationship between upstream timeslot identifiers under all upstream timeslot lengths and downstream timeslot identifiers under all downstream timeslot lengths according to the upstream timeslot lengths in all the timeslot templates and all the downstream timeslot lengths preset by the current device includes following operation S021.

At operation S021, according to the upstream timeslot lengths in all the timeslot templates, a number of upstream timeslots corresponding to the upstream timeslot lengths, all the downstream timeslot lengths preset by the current device, and a number of downstream timeslots corresponding to the downstream timeslot lengths, establishing a mapping relationship between upstream timeslot identifiers under all upstream timeslot lengths and downstream timeslot identifiers under all downstream timeslot lengths.

The number of the timeslots is obtained according to the number of the timeslot identifiers in the timeslot template; or, the number of upstream timeslots corresponding to the upstream timeslot length is a number of timeslots in a circular queue where the upstream timeslot length is located, and correspondingly, the number of downstream timeslots corresponding to the downstream timeslot length is a number of timeslots in a circular queue where the downstream timeslot length is located.

Specifically, the timeslot template is a circular queue template of timeslot dividing the network-wide time into a plurality of continuous and identical circular queues, each circular queue includes a fixed number of timeslots and timeslot identifiers corresponding to each timeslot, and a product of the number of the timeslots and the timeslot length is a length of the circular queue, so that the timeslot identifiers in the network-wide time are distributed circularly.

FIG. 6 is a flowchart illustrating an implementation of operation S021 according to the present disclosure. As shown in FIG. 6, operation S021 of the, according to the upstream timeslot lengths in all the timeslot templates, a number of upstream timeslots corresponding to the upstream timeslot lengths, all the downstream timeslot lengths preset by the current device, and a number of downstream timeslots corresponding to the downstream timeslot lengths, establishing a mapping relationship between upstream timeslot identifiers under all upstream timeslot lengths and downstream timeslot identifiers under all downstream timeslot lengths may include following operation S021a and S021b.

At operation S021a, in response to that a quotient N of a first downstream timeslot length and a first upstream timeslot length is an integer, and a product of the first upstream timeslot length and a number of upstream timeslots corresponding to the first upstream timeslot length is equal to a product of the first downstream timeslot length and a number of downstream timeslots corresponding to the first downstream timeslot length, establishing a mapping relationship between N upstream timeslot identifiers under the first upstream timeslot length and one downstream timeslot identifier under the first downstream timeslot length.

In operation S021a, for a downstream timeslot length which is an integer multiple (N times) of the upstream timeslot length, and is located in a circular queue with a length equal to a length of a circular queue in which the corresponding upstream timeslot length is located, N upstream timeslot identifiers under the upstream timeslot length are mapped to one downstream timeslot identifier under the downstream timeslot length, and generally, the established mapping relationship is a many-to-one mapping relationship, and thus, in operation S2, in a case where the first timeslot length and the first timeslot identifier carried in the target message correspond to the upstream timeslot length and one of the N upstream timeslot identifiers, the downstream timeslot length and the downstream timeslot identifier are respectively determined to be the second timeslot length and the second timeslot identifier.

For example, the first timeslot template exists in a first upstream device, the upstream timeslot length is correspondingly 40 microseconds, the number of the upstream timeslots is correspondingly four, and thus the length of the circular queue is 160 microseconds; a second timeslot template exists in a first forwarding device positioned at a downstream of the first upstream device, the downstream timeslot length is correspondingly 80 microseconds, the number of the downstream timeslots is correspondingly two, and thus the length of the circular queue is 160 microseconds; for establishing a mapping relationship, every two upstream timeslot identifiers under the upstream timeslot length are mapped to one downstream timeslot identifier under the downstream timeslot length, and the generated first timeslot mapping table is shown in Table 1.

TABLE 1

First Timeslot Mapping Table

| (upstream timeslot length, upstream timeslot identifier) | (downstream timeslot length, downstream timeslot identifier) |
|---|---|
| (40, 0) | (80, 0) |
| (40, 1) | (80, 0) |
| (40, 2) | (80, 1) |
| (40, 3) | (80, 1) |

At operation S021b, in response to that a quotient M of a second upstream timeslot length and a second downstream timeslot length is an integer, and a product of the second upstream timeslot length and a number of upstream timeslots corresponding to the second upstream timeslot length is equal to a product of the second downstream timeslot length and a number of downstream timeslots corresponding to the second downstream timeslot length, establishing a mapping relationship between one upstream timeslot identifier under the second upstream timeslot length and M downstream timeslot identifiers under the second downstream timeslot length.

In operation S021b, for an upstream timeslot length which is an integer multiple (M times) of the downstream timeslot length, and is located in a circular queue with a length equal to a length of a circular queue in which the corresponding downstream timeslot length is located, one upstream timeslot identifier under the upstream timeslot length is mapped to M downstream timeslot identifiers under the downstream timeslot length, and generally, the established mapping relationship is a one-to-many mapping relationship, and thus, in operation S2, in response to that the first timeslot length and the first timeslot identifier carried in the target message correspond to the upstream timeslot length and one of the upstream timeslot identifiers, the downstream timeslot length is determined to be the second timeslot length, and one of the M second timeslot identifiers is determined to be the second timeslot identifier; in some implementations, determining one of the M second timeslot identifiers to be the second timeslot identifier may include one of: randomly selecting one from the M downstream timeslot identifiers as the second timeslot identifier; selecting one having space in a corresponding cache from the M downstream timeslot identifiers as the second timeslot identifier; according to an arrangement sequence of the M downstream timeslot identifiers in the circular queue, selecting one, having space in the corresponding cache, at a front sequenced position from the M downstream timeslot identifiers as the second timeslot identifier; or the like.

For example, a third timeslot template exists in the second upstream device, the upstream timeslot length is correspondingly 80 microseconds, and the number of the upstream timeslots is correspondingly two, and thus the length of the circular queue is 160 microseconds; a fourth timeslot template exists in second forwarding device positioned at a downstream of the second upstream device, the downstream timeslot length is correspondingly 40 microseconds, the number of the downstream timeslots is corresponding four, and thus the length of the circular queue is 160 microseconds; for establishing a mapping relationship, each upstream timeslot identifier under the upstream timeslot length is mapped to two downstream timeslot identifiers under the downstream timeslot length, and the generated second timeslot mapping table is shown in Table 2.

TABLE 2

Second Timeslot Mapping Table

| (upstream timeslot length, upstream timeslot identifier) | (downstream timeslot length, downstream timeslot identifier) |
| --- | --- |
| (80, 0) | (40, 0) |
| (80, 0) | (40, 1) |
| (80, 1) | (40, 2) |
| (80, 1) | (40, 3) |

Figure 7:
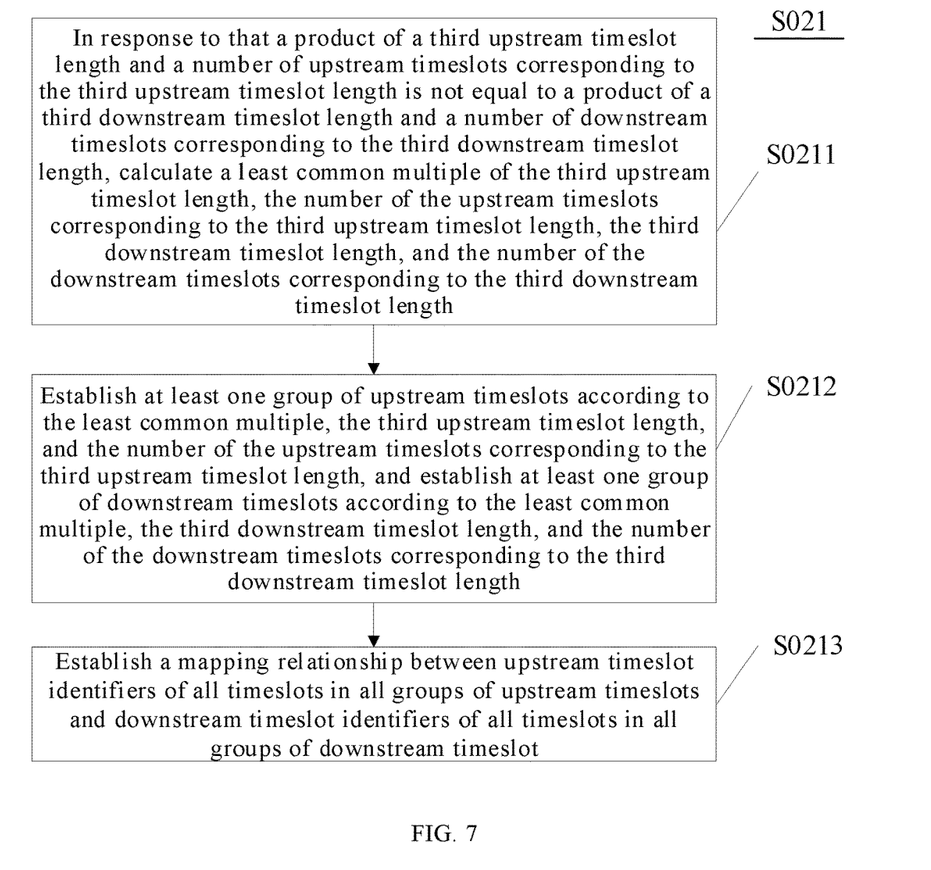
FIG. 7 is a flowchart illustrating an implementation of operation S021 according to the present disclosure.

FIG. 7 is a flowchart illustrating an implementation of operation S021 according to the present disclosure. As shown in FIG. 7, operation S021 of the, according to the upstream timeslot lengths in all the timeslot templates, a number of upstream timeslots corresponding to the upstream timeslot lengths, all the downstream timeslot lengths preset by the current device, and a number of downstream timeslots corresponding to the downstream timeslot lengths, establishing a mapping relationship between upstream timeslot identifiers under all upstream timeslot lengths and downstream timeslot identifiers under all downstream timeslot lengths includes following operations S0211, S0212 and S0213.

At operation S0211, in response to that a product of a third upstream timeslot length and a number of upstream timeslots corresponding to the third upstream timeslot length is not equal to a product of a third downstream timeslot length and a number of downstream timeslots corresponding to the third downstream timeslot length, calculating a least common multiple of the third upstream timeslot length, the number of the upstream timeslots corresponding to the third upstream timeslot length, the third downstream timeslot length, and the number of the downstream timeslots corresponding to the third downstream timeslot length.

In operation S0211, for an upstream timeslot length that is located in a circular queue with a length not equal to a length of a circular queue in which each downstream timeslot length is located, a least common multiple of the length of the circular queue in which the upstream timeslot length is located and the length of the circular queue in which one downstream timeslot length is located is calculated.

At operation S0212, establishing at least one group of upstream timeslots according to the least common multiple, the third upstream timeslot length, and the number of the upstream timeslots corresponding to the third upstream timeslot length, and establishing at least one group of downstream timeslots according to the least common multiple, the third downstream timeslot length, and the number of the downstream timeslots corresponding to the third downstream timeslot length.

In operation S0212, the number of groups of upstream timeslots is determined according to a quotient of the least common multiple and the length of the circular queue where the upstream timeslot length is located, and each single group of upstream timeslots includes at least one timeslot, correspondingly, the number of groups of downstream timeslots is determined according to ta quotient of the least common multiple and the length of the circular queue where the downstream timeslot length is located. The implementation corresponding to operation S021$a$ and the implementation corresponding to operation S021$b$ each are in essence a special case where each of the number of the groups of upstream timeslots and the number of the groups of downstream timeslot is equal to one.

At operation S0213, establishing a mapping relationship between upstream timeslot identifiers of all timeslots in all the groups of upstream timeslots and downstream timeslot identifiers of all timeslots in all the groups of downstream timeslots.

The mapping relationship between all upstream timeslot identifiers and all downstream timeslot identifiers may be established through above processes according to a relationship between numbers of the timeslots included in the groups of timeslots.

In some implementations, the implementation corresponding to operation S021$a$, the implementation corresponding to operation S021$b$, and the implementation corresponding to operations S0211 to S0213 may be deployed simultaneously, and for a same upstream timeslot length, one downstream timeslot length may be selected in a heuristic manner (i.e., by trial and error) to establish a set of mapping relationships, or a plurality of downstream timeslot lengths may be selected in a traversal manner (i.e., by traversing) to establish a plurality of sets of mapping relationships, and in a case where a plurality of sets of mapping relationships coexist, one set may be selected in a manner that an upstream device makes flag information be carried in the target message, or one set may be selected according to a policy judgment of the current device, or one set may be selected according to indication information issued by the network control plane.

The message forwarding method provided in the present disclosure is applicable for establishing the mapping relationship between timeslot identifiers under timeslot lengths in the upstream device and the current device based on a corresponding policy according to the timeslots (especially the timeslot template) supported by the upstream device and the current device, so that even if the current device in the network does not support a timeslot length selected for the upstream device sending a message, the current device in the network can select a forwarding timeslot according to the first timeslot information indicated in the message, thereby avoiding a situation that the message cannot be forwarded due to a fact that the timeslot length selected for the upstream device sending the message is not supported.

The message forwarding method provided in the present disclosure is described in detail below with reference to practical applications, and specifically, a third upstream device supports four timeslot templates, upstream timeslot lengths correspondingly include 10 microseconds, 20 microseconds, 40 microseconds, and 80 microseconds, and the number of the upstream timeslots is correspondingly two; a third forwarding device positioned at a downstream of the third upstream device has two timeslot templates, downstream timeslot lengths correspondingly include 40 microseconds and 80 microseconds, and the number of the downstream timeslots is correspondingly two; the third forwarding device receives the timeslot template information including four timeslot templates sent by the third upstream device through the LLDP, establishes a corresponding mapping relationship, and generates a third timeslot mapping table shown in Table 3.

TABLE 3

Third Timeslot Mapping Table

| (upstream timeslot length, upstream timeslot identifier) | (downstream timeslot length, downstream timeslot identifier) |
|---|---|
| (10, 0) | (40, 0) |
| (10, 1) | (40, 0) |
| (20, 0) | (40, 1) |
| (20, 1) | (40, 1) |
| (40, 0) | (80, 0) |
| (40, 1) | (80, 0) |
| (80, 0) | (80, 1) |
| (80, 1) | (80, 1) |

The third forwarding device receives a target message carrying first timeslot information (40, 0) sent by the third upstream device, and thus the first timeslot length is microseconds, and the first timeslot identifier is 0; the first timeslot length is taken as an upstream timeslot length, the first timeslot identifier is taken as an upstream timeslot identifier, and (80, 0) is obtained by searching from the timeslot mapping table, i.e., the downstream timeslot length is 80 microseconds, the downstream timeslot identifier is 0, and then the second timeslot length is 80 microseconds, and the second timeslot identifier is 0; the target message is placed into a cache queue corresponding to the second timeslot length being 80 microseconds and the second timeslot identifier being 0, the preset waiting time is a time duration corresponding to one second timeslot length, then, after 80 microseconds, a timeslot identifier corresponding to a current timeslot is 1, the first timeslot length being 40 microseconds in the target message is replaced by the first timeslot length being 80 microseconds, the first timeslot identifier being 0 is replaced by the first timeslot identifier being 1, and the target message is forwarded.

Figure 8:
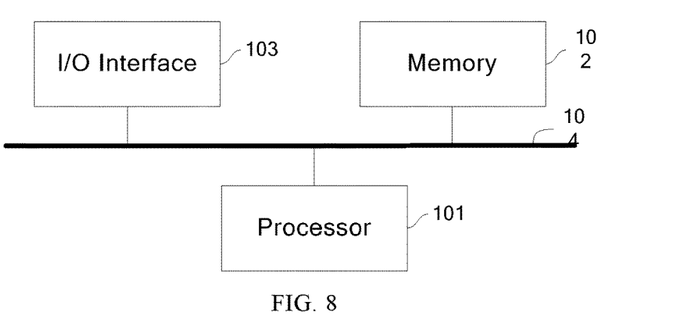
FIG. 8 is a schematic structural diagram of a message forwarding device according to the present disclosure.

FIG. 8 is a schematic structural diagram of a message forwarding device according to the present disclosure. As shown in FIG. 8, the message forwarding device includes: at least one processor 101; a memory (a storage device) 102 having at least one program stored thereon, the at least one program, executed by the at least one processor 101, causes the at least one processor 101 to perform the message forwarding method described above; and at least one I/O interface 103, connected between the processor 101 and the memory 102, and configured to implement information interaction between the processor 101 and the memory 102.

The processor 101 is a device having a capability of processing data, which includes, but is not limited to, a Central Processing Unit (CPU), and the like; the memory 102 is a device having a capability of storing data, which includes, but is not limited to, a random access memory (RAM, in particular, SDRAM, DDR, and the like), a read only memory (ROM), an electrically erasable programmable read only memory (EEPROM), and a FLASH; and the I/O interface (read/write interface) 103 is connected between the processor 101 and the memory 102, is configured to implement information interaction between the processor 101 and the memory 102, and includes, but is not limited to, a bus and the like.

In some implementations, the processor 101, the memory 102 and the I/O interface 103 are connected together through the bus 104, and are further connected to other components of a computing device.

Figure 9:
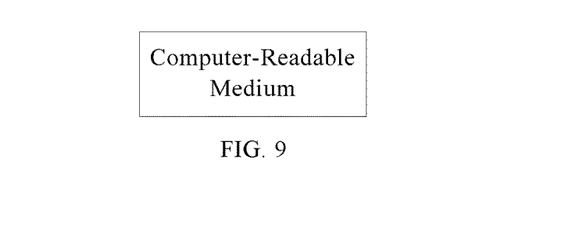
FIG. 9 is a schematic structural diagram of a computer-readable medium according to the present disclosure.

FIG. 9 is a schematic structural diagram of a computer-readable medium according to the present disclosure. The computer-readable medium having a computer program stored therein, the computer program, executed by a processor, causes the processor to perform the message forwarding method described above.

It should be understood by those of ordinary skill in the art that all or some of the operations in the method, the functional modules/components in the apparatus disclosed above may be implemented as software, firmware, hardware, or suitable combinations thereof. In a hardware implementation, the division between the functional modules/components stated above does not correspond to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). The computer storage medium includes volatile/nonvolatile or removable/non-removable medium used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read-Only Memory (CD-ROM), a Digital Video Disk (DVD) or other optical discs, magnetic cassettes, magnetic tapes, magnetic disks or other magnetic storage devices, or any other medium which can be used to store the desired information and can be accessed by a computer. The communication medium generally includes computer-readable instructions, data structures, program modules or other data in a modulated data signal, such as a carrier wave or other transmission mechanism, and may include any information delivery medium.

The present disclosure discloses the exemplary embodiments, and although specific terms are employed, they are used and should only be interpreted in a generic and descriptive meaning and not for purposes of a limitation. It is apparent to those skilled in the art that features, characteristics and/or elements described in connection with specific embodiments may be used alone or in combination with features, characteristics and/or elements described in connection with other embodiments, unless explicitly stated otherwise. Therefore, it should be understood by those skilled in the art that various changes in form and details may be made without departing from the scope of the present disclosure as set forth in the appended claims.

What is claimed is:

1. A message forwarding method, comprising:
receiving a target message from an upstream device, the target message carrying first timeslot information comprising a first timeslot length and a first timeslot identifier, the first timeslot information being configured to indicate a corresponding sending timeslot in which the upstream device sends the target message;
determining a second timeslot length and a second timeslot identifier according to the first timeslot length and the first timeslot identifier, the second timeslot length and the second timeslot identifier being configured to indicate a forwarding timeslot for forwarding the target message, the second timeslot identifier under the second timeslot length corresponding to the first timeslot identifier under the first timeslot length, the second timeslot length being different from the first timeslot length; and
in response to a preset waiting time elapses after the target message enters a cache queue corresponding to the second timeslot length and the second timeslot identifier, forwarding the target message.

2. The method according to claim 1, wherein the determining a second timeslot length and a second timeslot identifier according to the first timeslot length and the first timeslot identifier comprises:
taking the first timeslot length as an upstream timeslot length, taking the first timeslot identifier as an upstream timeslot identifier, searching a downstream timeslot length corresponding to the upstream timeslot length and a downstream timeslot identifier corresponding to the upstream timeslot identifier from a timeslot mapping table, taking the downstream timeslot length as the second timeslot length, and taking the downstream timeslot identifier as the second timeslot identifier,
wherein the timeslot mapping table records a mapping relationship between the upstream timeslot identifier under the upstream timeslot length and the downstream timeslot identifier under the downstream timeslot length of a current device.

3. The method according to claim 2, further comprising:
before receiving the target message from the upstream device, acquiring timeslot template information of the upstream device, the timeslot template information comprising at least one timeslot template comprising one corresponding upstream timeslot length and all upstream timeslot identifiers under the upstream timeslot length; and
establishing a mapping relationship between upstream timeslot identifiers under all upstream timeslot lengths and downstream timeslot identifiers under all downstream timeslot lengths according to the upstream timeslot lengths in all timeslot templates and all the downstream timeslot lengths preset by the current device, and generating the timeslot mapping table.

4. The method according to claim 3, wherein the acquiring timeslot template information of the upstream device comprises:
receiving the timeslot template information sent by the upstream device through a link layer discovery protocol.

5. The method according to claim 3, wherein the establishing a mapping relationship between upstream timeslot identifiers under all upstream timeslot lengths and downstream timeslot identifiers under all downstream timeslot lengths according to the upstream timeslot lengths in all timeslot templates and all the downstream timeslot lengths preset by the current device comprises:
according to the upstream timeslot lengths in all the timeslot templates, a number of upstream timeslots corresponding to the upstream timeslot lengths, all the downstream timeslot lengths preset by the current device, and a number of downstream timeslots corresponding to the downstream timeslot lengths, establishing a mapping relationship between upstream timeslot identifiers under all upstream timeslot lengths and downstream timeslot identifiers under all downstream timeslot lengths.

6. The method according to claim 5, wherein the, according to the upstream timeslot lengths in all the timeslot templates, a number of upstream timeslots corresponding to the upstream timeslot lengths, all the downstream timeslot lengths preset by the current device, and a number of downstream timeslots corresponding to the downstream timeslot lengths, establishing a mapping relationship between upstream timeslot identifiers under all upstream timeslot lengths and downstream timeslot identifiers under all downstream timeslot lengths comprises:
in response to that a quotient N of a first downstream timeslot length and a first upstream timeslot length is an integer, and a product of the first upstream timeslot length and a number of upstream timeslots corresponding to the first upstream timeslot length is equal to a product of the first downstream timeslot length and a number of downstream timeslots corresponding to the first downstream timeslot length, establishing a mapping relationship between N upstream timeslot identifiers under the first upstream timeslot length and one downstream timeslot identifier under the first downstream timeslot length; and
in response to that a quotient M of a second upstream timeslot length and a second downstream timeslot length is an integer, and a product of the second upstream timeslot length and a number of upstream timeslots corresponding to the second upstream timeslot length is equal to a product of the second downstream timeslot length and a number of downstream timeslots corresponding to the second downstream timeslot length, establishing a mapping relationship between one upstream timeslot identifier under the second upstream timeslot length and M downstream timeslot identifiers under the second downstream timeslot length.

7. The method according to claim 5, wherein the, according to the upstream timeslot lengths in all the timeslot templates, a number of upstream timeslots corresponding to the upstream timeslot lengths, all the downstream timeslot lengths preset by the current device, and a number of downstream timeslots corresponding to the downstream timeslot lengths, establishing a mapping relationship between upstream timeslot identifiers under all upstream timeslot lengths and downstream timeslot identifiers under all downstream timeslot lengths further comprises:
in response to that a product of a third upstream timeslot length and a number of upstream timeslots corresponding to the third upstream timeslot length is not equal to a product of a third downstream timeslot length and a number of downstream timeslots corresponding to the third downstream timeslot length, calculating a least common multiple of the third upstream timeslot length, the number of the upstream timeslots corresponding to the third upstream timeslot length, the third downstream timeslot length, and the number of the downstream timeslots corresponding to the third downstream timeslot length;

establishing at least one group of upstream timeslots according to the least common multiple, the third upstream timeslot length, and the number of the upstream timeslots corresponding to the third upstream timeslot length, and establishing at least one group of downstream timeslots according to the least common multiple, the third downstream timeslot length, and the number of the downstream timeslots corresponding to the third downstream timeslot length; and establishing a mapping relationship between upstream timeslot identifiers of all timeslots in all groups of upstream timeslots and downstream timeslot identifiers of all timeslots in all groups of downstream timeslot.

8. The method according to claim 1, wherein the forwarding the target message comprises:

replacing the first timeslot length with the second timeslot length, replacing the first timeslot identifier with a timeslot identifier corresponding to a current timeslot after the waiting time, and forwarding the target message.

9. A message forwarding device, comprising:

at least one processor; and a storage device storing at least one program thereon;

the at least one program, executed by the at least one processor, causes the at least one processor to implement the method of claim 1.

10. A computer-readable medium having a computer program stored thereon, the computer program, executed by a processor, causes the processor to perform the method of claim 1.

* * * * *